(12) United States Patent
Niklaus et al.

(10) Patent No.: US 10,356,537 B2
(45) Date of Patent: Jul. 16, 2019

(54) ALL-IN-ONE METHOD FOR WIRELESS CONNECTIVITY AND CONTACTLESS BATTERY CHARGING OF SMALL WEARABLES

(71) Applicant: SEMICONDUCTOR COMPONENTS INDUSTRIES, LLC, Phoenix, AZ (US)

(72) Inventors: Marcus P. Niklaus, Fenin (CH); Onur Kazanc, Neuchatel (CH)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/829,482

(22) Filed: Dec. 1, 2017

(65) Prior Publication Data

US 2019/0174239 A1 Jun. 6, 2019

(51) Int. Cl.
*H04R 25/00* (2006.01)
*H04B 5/00* (2006.01)
(Continued)

(52) U.S. Cl.
CPC ............. *H04R 25/554* (2013.01); *H01Q 7/00* (2013.01); *H02J 7/0029* (2013.01); *H02J 7/025* (2013.01);
(Continued)

(58) Field of Classification Search
CPC .. H04R 1/1025; H04R 25/552; H04R 25/554; H04R 25/558; H04R 25/602; H04R 2225/31; H04R 2225/51; H02J 7/025
(Continued)

(56) References Cited

U.S. PATENT DOCUMENTS 8,644,542 B2 * 2/2014 Klemenz ............... H04R 25/554
381/323
8,818,297 B2 8/2014 Merlin
(Continued)

OTHER PUBLICATIONS

Wireless Power Consortium, "The Qi Wireless Power Transfer System, Power Class 0 Specification, Part 4: Reference Designs," Version 1.2.2, Apr. 2016, 309 pages.
(Continued)

*Primary Examiner* — Huyen D Le
(74) *Attorney, Agent, or Firm* — Ramey & Schwaller, LLP

(57) ABSTRACT

One illustrative wearable device embodiment includes: a battery; an antenna coil; a wireless charging module coupled to the antenna coil to harvest wireless power for charging the battery; an NFC (near field communications) module coupled to the antenna coil to receive a query signal and provide a tag response signal; and an NFMI (near field magnetic induction) module coupled to the antenna coil to send and receive audio streams. An illustrative wireless communications method embodiment includes: coupling an antenna coil to a wireless charging module to charge a battery; coupling the antenna coil to an NFC (near field communications) module; and coupling the antenna coil to an NFMI (near field magnetic induction) module to send or receive an audio stream. When coupled, the NFC module receives a query signal, provides a tag response signal, and receives a command signal to set at least one parameter value affecting rendering of the audio stream.

19 Claims, 2 Drawing Sheets

(51) Int. Cl.
   *H01Q 7/00* (2006.01)
   *H02J 7/00* (2006.01)
   *H02J 7/02* (2016.01)
   *H01Q 1/27* (2006.01)

(52) U.S. Cl.
   CPC ......... *H04B 5/0037* (2013.01); *H04R 25/602* (2013.01); *H01Q 1/273* (2013.01); *H04R 25/552* (2013.01); *H04R 2225/31* (2013.01); *H04R 2225/51* (2013.01)

(58) Field of Classification Search
   USPC ......... 381/315, 323, 328, 330, 331; 320/108
   See application file for complete search history.

(56) References Cited

U.S. PATENT DOCUMENTS

| | | |
|---|---|---|
| 8,983,374 B2 | 3/2015 | Wiley |
| 9,030,052 B2 | 5/2015 | Kim et al. |
| 9,031,502 B2 | 5/2015 | Smith |
| 9,124,121 B2 | 9/2015 | Ben-Shalom et al. |
| 9,276,414 B2 | 3/2016 | Park et al. |
| 9,300,164 B2 | 3/2016 | Yoon |
| 2010/0190436 A1 | 7/2010 | Cook et al. |
| 2013/0243230 A1* | 9/2013 | Angst ................ H04R 25/554 381/323 |
| 2014/0241555 A1* | 8/2014 | Terlizzi ............. H04B 5/0006 381/315 |
| 2016/0029319 A1 | 1/2016 | Rajakarunanayake |

OTHER PUBLICATIONS

Wireless Power Consortium, "The Qi Wireless Power Transfer System, Power Class 0 Specification, Parts 1 and 2: Interface Definitions," Version 1.2.2, Apr. 2016, 160 pages.

* cited by examiner

ALL-IN-ONE METHOD FOR WIRELESS CONNECTIVITY AND CONTACTLESS BATTERY CHARGING OF SMALL WEARABLES

BACKGROUND

Wearable devices include biometric devices, recording devices, and communications devices, such as hearing aids. Hearing aids are devices designed to improve the hearing of a user, aids in communications.

When designing a wearable device such as a hearing aid, the size of the device is typically considered. Typically, a hearing aid is sufficiently small to fit either in a human ear canal or behind the outer ear. As the capabilities or functionalities of a device such as a hearing aid are improved or expanded, their space requirements are balanced against the device's size limitations.

SUMMARY

Aspects of the current disclosure are directed to wearable devices, e.g., hearing aids, with wireless communication capabilities. One illustrative wearable device embodiment includes: a battery; an antenna coil; a wireless charging module coupled to the antenna coil to harvest wireless power for charging the battery; an NFC (near field communications) module coupled to the antenna coil to receive a query signal and provide a tag response signal; and an NFMI (near field magnetic induction) module coupled to the antenna coil to send and receive audio streams. An illustrative wireless communications method embodiment includes: coupling an antenna coil to a wireless charging module to charge a battery; coupling the antenna coil to an NFC (near field communications) module; and coupling the antenna coil to an NFMI (near field magnetic induction) module to send or receive an audio stream. When coupled, the NFC module receives a query signal, provides a tag response signal, and receives a command signal to set at least one parameter value affecting rendering of the audio stream.

Each of the foregoing embodiments may optionally be employed individually or together and may optionally include one or more of the following features in any suitable combination: 1. a microphone and speaker that enable operation as a hearing aid. 2. the audio streams are exchanged by said hearing aid in a first ear of a user with a second hearing aid in a second, opposite ear of said user. 3. the NFC module further reports parameter values and accepts new parameter values for operation as said hearing aid. 4. the antenna coil comprises a ferrite element. 5. a controller that selectively enables one of said wireless charging, NFC, and NFMI modules at a time. 6. an adjustable capacitance in series or parallel with said antenna coil to provide a tunable resonant frequency. 7. the controller adjusts the resonant frequency to a value suitable for the selected one of said wireless charging, NFC, and NFMI modules. 8. the controller systematically cycles through each resonant frequency value for said wireless charging, NFC, and NFMI modules. 9. the controller monitors charging of the battery when the wireless charging module is selected and, upon detecting an overvoltage, the controller adjusts the capacitance to detune the antenna coil to a different resonant frequency that protects against the overvoltage. 10. the adjustable capacitance is in parallel with said antenna coil. 11. rendering the audio stream via a speaker in a hearing aid. 12. the at least one parameter value is volume.

Figure 1:
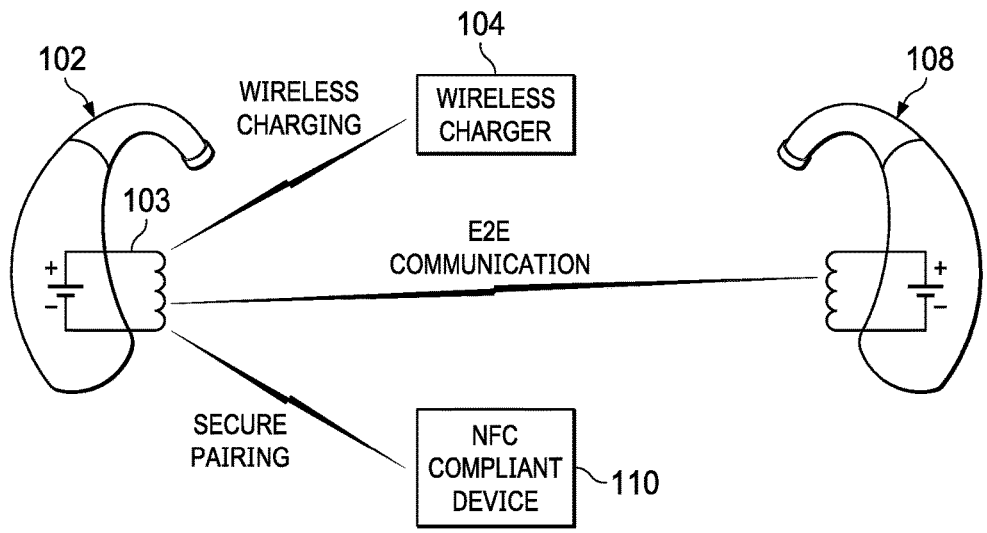
FIG. 1 is a diagram illustrating examples of wireless connection modes according to at least one embodiment.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Embodiments described herein are directed to wearable devices. Particular embodiments are directed to smaller wearable devices such as hearing aids.

Wearable devices may wirelessly connect with other devices, e.g., within the context of a Personal Area Network (PAN). As such, the wearable devices may wirelessly communicate with other devices that are near or around the body. These other devices include mobile telephones (e.g., smartphones), tablets, and computers. One type of standardized wireless link that is used to facilitate such wireless connections is Bluetooth Low Energy (BLE). By using BLE to wirelessly connect a device such as a hearing aid with a device such as a smartphone, a user interface for controlling the hearing aid may be made available, e.g., on the touch screen of the smartphone. As such, user controls, which may be difficult to access given the relatively small size of the hearing aid, can be transposed to the touch screen of a smartphone, tablet, or other similarly convenient electronic device.

However, BLE does not address other types of wireless connections. For example, BLE does not adequately support low-power transmission of data streams (e.g., audio data) around the body. Such transmissions may occur over a relatively short range, e.g., from a hearing aid at one ear of a user to a hearing aid at the other ear of the user.

As another example, BLE may not support an adequately secure pairing of devices, such as a pairing that involves communication with a passive (or active) tag using NFC (Near Field Communication). Such a transmission typically is performed at relatively low power levels, and occurs over a relatively short range, for purposes of increasing security. Rather, BLE typically facilitates "just works" connections, by which any BLE-enabled devices that are within range of each other are paired, without requiring successful authentication or security-related procedures. While desirable in many circumstances, such facile connections may not be suitable in medical or health care contexts, including those involving devices such as hearing aids.

Certain workarounds have been developed. For example, secure pairing can be performed via BLE if a password is entered by a user at a first device and transmitted by the first device to be received at a second device, where the password may be successfully verified, enabling the first and second devices to become paired. However, such an authentication procedure may not be suitable when the first device, such as a hearing aid, is relatively small and, due to size limitations, includes neither a touch screen nor a keyboard. As such, it would be difficult for a user to enter a password at the device.

As yet another example, BLE does not natively support wireless charging of a device (e.g., charging a battery internal to the device).

Each of the exemplary shortcomings identified above can be addressed with alternative wireless transceivers that typically employ dedicated radio frequency (RF) radios and associated components (e.g., antenna, crystal oscillator, and passive components). For example, an NFC transceiver typically uses a dedicated radio integrated circuit (IC) and a corresponding loop antenna. Incorporating multiple radios in a single device thus tends to increase the footprint of the device. If BLE capability is also included, then the addition of a BLE radio would also be utilized. The addition of a BLE radio would further increase the footprint of the device and increase power consumption.

Accordingly, various herein-disclosed embodiments are directed to a wearable device (e.g., a hearing aid) using a single radio to support multiple types of wireless connections. According to particular embodiments, a single magnetic-induction antenna is utilized to communicate in multiple frequency ranges with different wireless communication protocols. Because a single transceiver with a single antenna is used, the footprint of the wearable device is not increased.

FIG. 1 is a diagram illustrating examples of wireless connection modes according to at least one device embodiment. For purposes of convenience, the modes will be described with reference to a hearing aid 102. However, it is understood that other types of wearable devices may be employed. Examples of such devices include ear buds, headsets, watches, biometric devices, implants, fitness monitors, augmented reality viewers, and other wearable electronics.

The hearing aid 102 includes an RF transceiver 103. At any one particular time (or period), the RF transceiver 103 is utilized to support a distinct wireless connection mode.

In one wireless connection mode, the hearing aid 102 is wirelessly connected to a wireless charger 104. When the hearing aid 102 and the wireless charger 104 are connected via the transceiver 103, then the hearing aid 102 can be wirelessly charged. As such, wired connections are not needed to recharge one or more batteries of the hearing aid 102.

According to at least one embodiment, the wireless charging is conducted according to the Rezence interface standard that was developed by the Alliance for Wireless Power (A4WP) for wireless charging. In this situation, the wireless charger 104 includes a power transmitter unit (PTU), such as a Rezence wireless charging mat. According to at least one embodiment, the Rezence wireless charging mat operates at a frequency of 6.78 MHz. The RF transceiver 103 functions to allow the hearing aid 102 to operate as a power receiver unit (PRU).

When a charging cradle is used during wireless charging, parameters related to overvoltage protection may be controlled. As will be described in more detail later with reference to FIG. 2, at least one embodiment is directed to providing overvoltage protection in the absence of such a charging cradle.

In another wireless connection mode, the hearing aid 102 is wirelessly connected to another wearable device (e.g., a second hearing aid 108). For example, the hearing aid 102 may be worn at the left/right ear of a user, and the hearing aid 108 may be worn at the right/left ear of the user. The selection of a pair of such hearing aids may be referred to as a "binaural fitting." When the hearing aid 102 and the hearing aid 108 are connected via the transceiver 103, then control and/or audio data may be transmitted between the hearing aids 102, 108. As such, ear-to-ear communication can be conducted. Transmission of audio data in this manner facilitates around-the-body communication, e.g., to provide features such as stereo reception. Other features that may be provided by binaural hearing aids include listening enhancement features such as better noise reduction, better directional sound pick up, etc.

According to at least one embodiment, a near field magnetic induction (NFMI) protocol is utilized to transmit data between the hearing aids 102, 108. In at least one embodiment, a carrier frequency of (or around) 10 MHz is used. NFMI enables dynamic exchange of data between hearing aids 102, 108 at low power levels. Further, NFMI establishes a reliable link between the hearing aids 102, 108, even when they are separated by a human head which would otherwise tend to absorb and reflect certain radio frequencies and thereby inhibit successful transmission of data.

In another wireless connection mode, the hearing aid 102 is wirelessly connected to a device 110. In at least one embodiment, the device 110 is a near-field communications (NFC) compliant device such as a smartphone. When the hearing aid 102 and the device 110 are connected via the transceiver 103, data for pairing the hearing aid and the device may be exchanged in a secure manner. This exchange would not require that a user enter a password.

When employed in devices such as a smartphone, NFC facilitates the reading of active and passive tags, e.g., for secure payment purposes. In at least one embodiment—for the purposes of connecting the hearing aid 102 and the device 110 via the transceiver 103, the hearing aid 102 is placed sufficiently close to the device 110 for a short duration of time. For example, the hearing aid 102 (slave device) is placed within 1 cm of the device 110 (master device).

According to at least one embodiment, the device 110 sends an inquiry signal (or query signal). Upon receiving the inquiry signal, the hearing aid 102 responds to the device 110 by sending a tag response signal. If the device 110 recognizes the tag response signal as authentic, then the hearing aid 102 and the device 110 become connected. The device 110 may then send commands (using either the NFC protocol or the BLE protocol) to the hearing aid to, e.g., determine the current values of various parameters such as, e.g., volume, equalization, battery charge, noise cancellation level, parameters for directional sensing, etc. Further commands may also be sent to adjust the parameter settings.

In at least one embodiment, energy for receiving and transmitting such signals is derived from energization by the inquiry signal. In this situation, the hearing aid 102 behaves as a passive tag device. In other embodiment(s)—as will be described in more detail later—energy for receiving and transmitting such signals is derived, at least partially, from the internal battery of the hearing aid 102. In this situation, the hearing aid 102 behaves, at least partially, as an active tag device.

In at least one embodiment, a signal frequency of about 13.56 MHz is used to conduct the NFC. The frequencies disclosed herein (wireless charging at 6.78 MHz, NFMI at 10 MHz, and NFC at 13.56 MHz) are design parameters that can be varied and in any case, may be subject to tolerances of +/−1 MHz or more.

According to embodiments described herein, the transceiver 103 enables the hearing aid 102 to support the different wireless connection modes that have been described. For example, at one particular time, the transceiver 103 is configured to wirelessly connect the hearing aid 102 and the wireless charger 104, e.g., to facilitate wireless charging. At another particular time, the transceiver 103 is configured to wirelessly connect the hearing aid 102 and the wearable device 108, e.g., to facilitate communication of data between the wearable devices. At yet another particular time, the transceiver 103 is configured to wirelessly connect the hearing aid 102 and the device 110, e.g., for the purpose of device authentication. As will be described in more detail later with respect to at least one embodiment, the transceiver 103 is configurable to support a selected one of the wireless connection modes.

Figure 2:
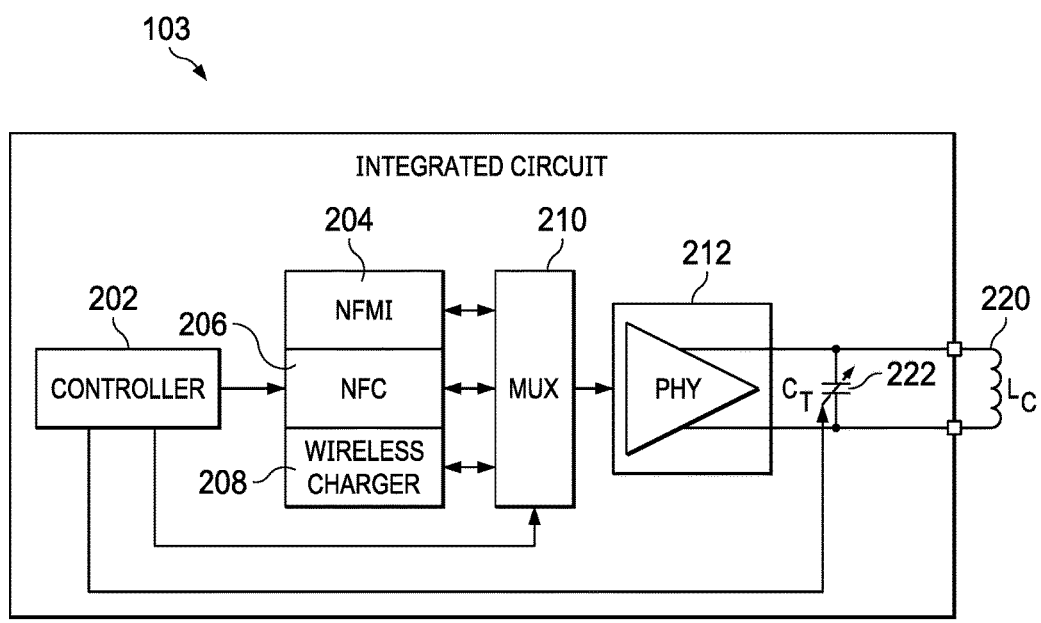
FIG. 2 is a block diagram of a transceiver of a hearing aid according to at least one embodiment.

FIG. 2 is a block diagram of the transceiver 103 of the hearing aid 102 according to at least one embodiment. The transceiver 103 includes a controller 202. The controller 202 controls transmission and/or reception of signals by the transceiver 103. The controller 202 is coupled to an NFMI module 204 that controls transmission and/or reception of NFMI signals, an NFC module 206 that controls transmission and/or reception of NFC signals, and a wireless charger module 208 that controls reception of wireless charging signals. A multiplexer 210 operates under control of the controller 202 to couple a selected one of the modules 204-208 to a shared physical layer interface 212 for the antenna. The illustrated antenna takes the form of a coil 220 around a ferrite element or other high magnetic permeability material to improve coupling efficiency between the coil and received or radiated electromagnetic fields. An illustrative coil diameter for use in a hearing aid is 1.5 mm and an illustrative coil length is 5 mm.

A capacitance 222 is provided in series or parallel with the coil 220 and is tuned by the controller 202 to be, in combination with the inductance of coil 220, resonant the frequency suitable for the selected one of the modules 204-208. Physical layer interface 212 includes a transmit driver for driving the antenna and hybrid or other form of directional coupler for separating receive signals from the transmit signals. Current driven through coil 220 produces an electromagnetic signal that radiates outwardly in a magnetic dipole pattern. Conversely, electromagnetic fields received by the coil 220 induce a current or voltage signal between the coil's terminals. Capacitance 222 is variable. The controller 202 changes the capacitance of the variable capacitor 222 to effectively tune the transceive antenna. When tuned by the variable capacitor 222, the transceive antenna resonates at a particular frequency (e.g., a particular frequency out of a set of particular frequencies), enabling the coil 220 to more efficiently transmit and receive signals at the resonant frequency. The resonant frequency may be equal to the reciprocal of $(2\pi*\sqrt{L*C})$, where L denotes the inductance of the coil 220 and C denotes the capacitance of the variable capacitance 222.

In at least one embodiment, the set of frequencies includes frequencies that were identified earlier with reference to the wireless connection modes of FIG. 1. Accordingly, the controller 202 may change the capacitance of the variable capacitor 222 to effectively tune the transceive antenna to resonate at a frequency of (or around) 6.78 MHz, 13.56 MHz, or 10 MHz.

Figure 3:
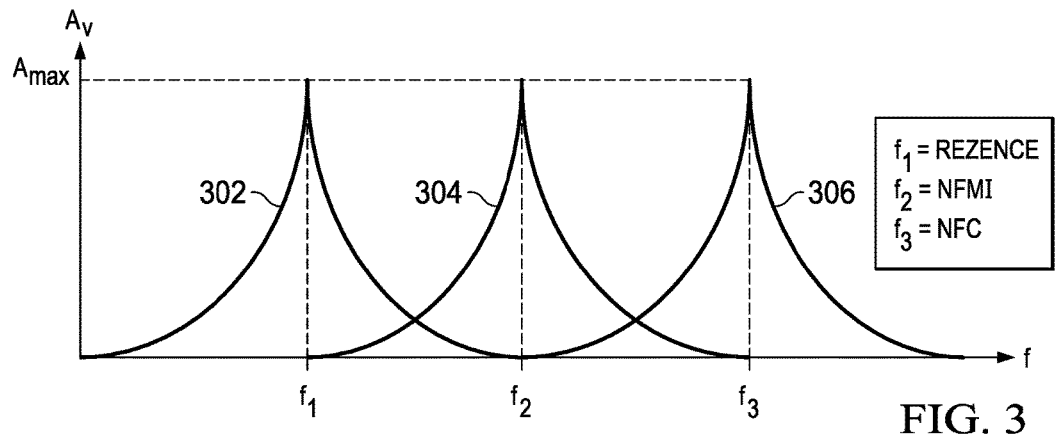
FIG. 3 illustrates examples of an antenna bandwidth of a transceive antenna according to at least one embodiment.

FIG. 3 illustrates examples of an antenna's frequency response when tuned to three different resonant frequencies, according to at least one embodiment. For example, at a particular time, the controller 202 may adjust the variable capacitance 222 to tune antenna to resonate at a frequency $f_1$ that is suitable for supporting wireless charging. In this situation, the antenna exhibits a frequency response 302 that is centered around the frequency $f_1$. The frequency $f_1$ may be at or around 6.78 MHz, the carrier frequency of the Rezence wireless charging standard. When the antenna is tuned to resonate at the frequency $f_1$, then it is suited to receive a charging signal, e.g., from wireless charger 104 (see FIG. 1). Controller 202 (FIG. 2) uses multiplexer 210 to couple the physical layer interface 212 to wireless charger module 208, which uses the charging signal to recharge the internal battery.

As another example, at a particular time, the controller 202 may adjust the variable capacitance 222 to tune the antenna to resonate at a frequency $f_3$ that is suitable for transmitting and receiving NFC signals. In this situation, the antenna exhibits a frequency response 306 that is centered around the frequency $f_3$. The frequency $f_3$ may be at or around 13.56 MHz, the frequency band for the NFC standard. When the antenna is tuned to resonate at the frequency $f_3$, then it is suited to receive and transmit NFC signals. Controller 202 uses multiplexer 210 to couple the physical layer interface 212 to the NFC module 206, which can detect an NFC query signal and generate a tag response signal that is to be received by device 110 (see FIG. 1).

As another example, at a particular time, the controller 202 may adjust the variable capacitance 222 to tune the antenna to resonate at a frequency $f_2$ that is suitable for transmitting and receiving NFMI signals. In this situation, the antenna exhibits a frequency response 304 that is centered around the frequency $f_2$. The frequency $f_2$ may be at or around 10 MHz or some other suitable frequency chosen for NFMI communications. When the antenna is tuned to resonate at the frequency $f_2$, then it is suited to transmit an NFMI signal, e.g. a signal carrying audio data that is to be received by a second hearing aid 108, or to receive an NFMI signal such as a signal carrying noise canceling data from the second hearing aid 108 (see FIG. 1). Controller 202 uses multiplexer 210 to couple the physical layer interface 212 to the NFMI module which can receive and transmit NFMI signals.

With reference back to FIG. 2, the transceiver 103 uses a single antenna (transceive antenna 220) to support the different wireless connection modes that have been described. Rather than require two or more different radio antennas, only a single antenna is utilized. Accordingly, the footprint of the associated device (e.g., hearing aid 102) is not increased.

In practice, an antenna coil 220 experiences parasitic effects and may be optimized for operation at a particular resonant frequency where it is most efficient. According to at least one embodiment, the antenna coil is optimized for operation at a resonant frequency of 13.56 MHz for NFC communications. Although this frequency is optimal with respect to antenna coil efficiency, the performance of the antenna coil 220 when tuned to resonate at other frequencies (e.g., 10 MHz, 6.78 MHz) is still acceptable. For example, the antenna coil 220 may be less efficient when it resonates at 6.78 MHz (the wireless charging frequency). However, this efficiency loss may be acceptable because the battery capacity of a device such as hearing aid 102 is less than that of other devices that are charged wirelessly (e.g., mobile phones). Further, the loss of efficiency may permit charging the battery of the hearing aid 102 at lower charging rates and thereby aid in providing overvoltage protection.

As described earlier with reference to various embodiments, the antenna is tuned to resonate at a particular frequency in order to support a particular function (e.g., wireless charging, NFC signal transmission/reception, NFMI signal transmission/reception). In at least one further embodiment, the antenna is tuned to resonate at a particular frequency that is sufficiently distant from one or more other frequencies. Such a tuning may occur, for example, in order to provide or supplement the hearing aid's overvoltage protection. While the previously-mentioned Rezence wireless charging allows receivers to include overvoltage protection circuitry and further provides transmitters with protocols for limiting the charging voltage, not all transmitters comply with the standard and the overvoltage protection circuitry can be thermally constrained, so it may be desirable to provide for additional protection from damage caused by receiving signals at undesired frequencies and/or signals having power levels that are too strong. For example, while wireless charging is occurring, the level of the power that is harvested may grow too high for the overvoltage protection circuitry to handle for a protracted time. In this situation, the controller 202 may perform a significant de-tuning of the antenna to reduce a risk of damage to the hearing aid 102. For example, the controller 202 may reduce (or increase) the variable capacitance 222 to adaptively adjust the resonance frequency to a value where the wireless charging power is sufficient for charging but low enough to protect the charging circuit and battery from damage. When charging is complete, the controller may further adjust the resonant frequency to a value where the harvesting of energy from the charging signal (e.g., transmitted by the wireless charger 104) terminates. In this manner, the antenna is controlled to protect the hearing aid 102 from a risk of being damaged by a harvested power level that is overly high.

As shown in FIG. 3, when the antenna is tuned to one of the selected resonant frequencies, it may not be suitable for use at the other selectable resonant frequencies. According to at least one embodiment, the controller may accordingly "scan" for signals at the various frequencies by systematically switching the variable capacitance setting in a time-multiplexed fashion. The timing of the tuning adjustments may be based on an input signal that is received at the controller 202. For example, the input signal may be a clock signal, and the controller 202 may tune the antenna to resonate at a different frequency at every rising and/or at every falling edge of the clock signal. As such, the controller 202 may cause the antenna's resonant frequency to sequentially cycle through a set of two or more resonant frequencies based on the received clock signal. The period of the clock signal determines the duration of time during which the antenna resonates at each frequency.

Upon tuning the antenna to resonate at a particular frequency, the controller 202 also uses the multiplexer 210 to couple physical layer interface with the antenna coil 220 to the appropriate one of the modules 204-208, thereby selecting the corresponding communication protocol for detecting incoming signals (wireless charging, NFMI, NFC) and/or sending outgoing signals (NFMI, NFC). In alternative embodiments, the controller 202 may maintain the antenna tuning at a primary frequency, retuning to other frequencies only infrequently or in response to trigger events (e.g., a squeeze, tap, or button push; a low battery warning; a received command).

As described earlier with reference to FIG. 1, the hearing aid 102 may receive an inquiry signal from and transmit a tag response signal to an NFC device 110. In some situations, the hearing aid 102 may behave as a passive device in receiving the inquiry signal and transmitting the tag response signal. That is, proper reception and transmission of the signals (including demodulation and/or modulation) are fully supported by energy that is harvested (or derived) from the inquiry signal that arrives at the antenna coil 220 of the hearing aid 102. In this manner, the hearing aid 102 behaves as a passive device.

In some situations, energy that is harvested from the inquiry signal may not be sufficient to drive the operations noted in the paragraph above. For example, the size of the antenna coil 220 may not be sufficiently large to harvest the required amount of energy from the inquiry signal. In at least one embodiment, at least a portion of the required amount of energy is provided from the battery of the wearable device 102 (e.g., the battery that would be recharged by the wireless charger 104 during charging operations. For example, power is provided from the battery to support receiving the inquiry signal and/or transmitting the tag response signal when the controller 202 selects a communication protocol corresponding to NFC. In this regard, a front-end module in the hearing aid 102 for supporting reception of NFC signals may have differences with respect to a module that is typically utilized in passive tag devices.

Figure 4:
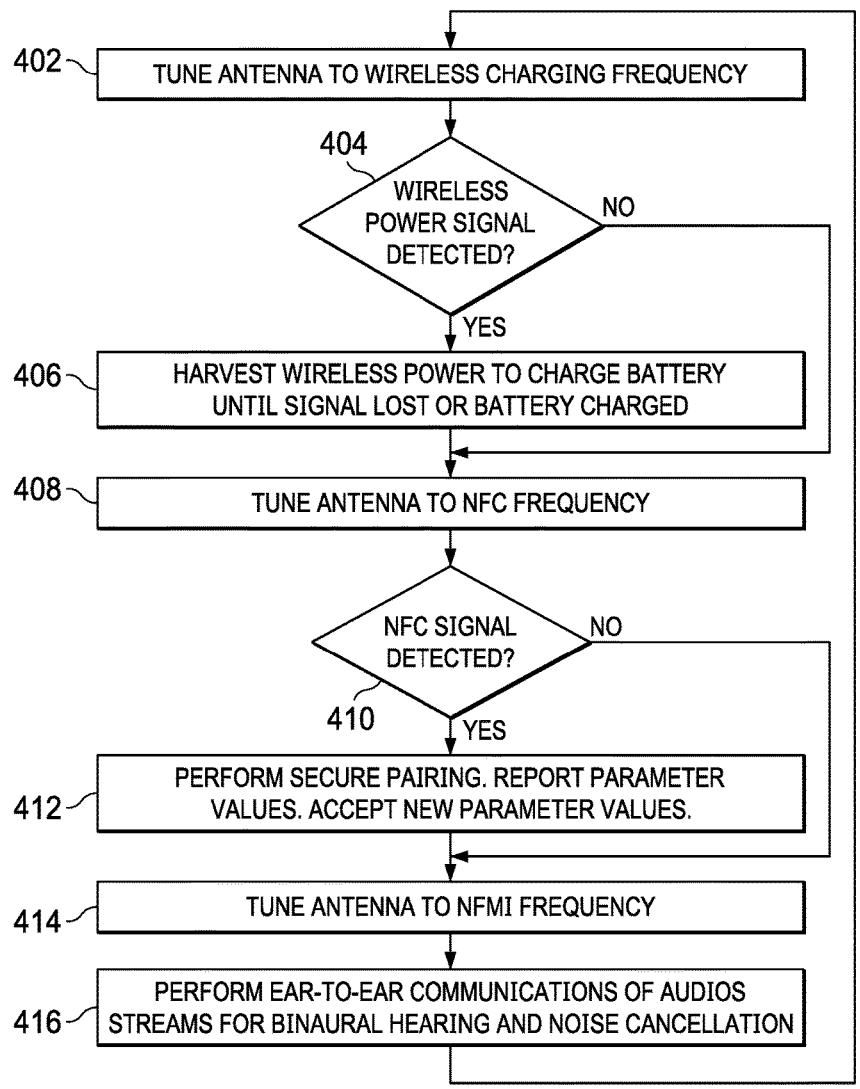
FIG. 4 is a flowchart of a method of operating a wearable device according to at least one embodiment.

FIG. 4 is a flow diagram of an illustrative wireless communications method that may be implemented by the described hearing aids 103, 108. It begins with block 402, where the controller adjusts the capacitance to tune the antenna coil to the wireless charging frequency and couples the antenna to the wireless charging module. In block 404, the controller checks the received signal level to determine if a wireless power signal is present. If so, in block 406 the module is enabled to harvest the wireless power for charging the internal battery of the device. In at least some embodiments, the controller maintains the antenna coupling to the wireless charging module until the wireless power signal is lost or the battery is fully charged.

If no wireless power signal is detected in block 404, or once charging is complete in block 406, the method flows to block 408 where the controller adjusts the capacitance to tune the antenna coil to the NFC frequency and couples the antenna to the NFC module. In block 410, the controller checks for received NFC signals. If an NFC signal is detected, in block 412 the NFC module responds to the NFC signal as an active or passive RFID tag, enabling the external device to establish a secure pairing with If no NFC signal is detected in block 410, or once the NFC communications are completed in block 412, the method flows to block 414 where the controller adjusts the capacitance to tune the antenna coil to the NFMI frequency and couples the antenna to the NFMI module. In block 416, the NFMI module connects with one or more on-body devices to exchange data. In at least some contemplated embodiments, the data includes ear-to-ear audio streams exchanged with a second hearing aid to provide binaural hearing, noise cancellation, directional gain, and other such hearing enhancements. The period for data exchange may be limited to a fixed duration to ensure periodic retuning and checking in blocks 402-404 and 410-412.

Various embodiments described herein are directed to provide features related to wireless connectivity in a device (such as a hearing aid), without necessarily increasing the physical (mechanical) size of the device. For example, a single antenna may be utilized to support multiple wireless functions (e.g., wireless charging, NFMI communications, NFC communications). It is understood that the device may be configured to support any combination of one or more of such wireless functions. As used herein, the terms "about" or "around" a given frequency may refer to a range of ±100 ppm, ±1%, ±5%, ±10%, or within the passband of the appropriate protocol being used.

Particular embodiments have been described with reference to hearing aids. However, one of ordinary skill will recognize that features of such embodiments may also be employed in other wearable electronic devices, e.g., earbuds, headsets, etc. These and numerous other modifications, equivalents, and alternatives, will become apparent to those skilled in the art once the above disclosure is fully appreciated. For example, the variable capacitance may take the form of a switchable arrangement of fixed capacitors that the controller can select or combine to provide the desired capacitance values. It is intended that the following claims be interpreted to embrace all such modifications, equivalents, and alternatives where applicable.

What is claimed is:

1. A wearable device comprising:
   a battery;
   an antenna coil;
   a wireless charging module coupled to the antenna coil to harvest wireless power for charging the battery;
   an NFC (near field communications) module coupled to the antenna coil to receive a query signal and provide a tag response signal;
   an NFMI (near field magnetic induction) module coupled to the antenna coil to send and receive audio streams;
   a controller; and
   an adjustable capacitance in series or parallel with said antenna coil to provide a tunable resonant frequency, wherein the controller adjusts the resonant frequency to a value suitable for a selected one of said wireless charging, NFC, and NFMI modules.

2. The device of claim 1, further comprising a microphone and speaker, wherein the device operates as a hearing aid.

3. The device of claim 2, wherein said audio streams are exchanged by said hearing aid in a first ear of a user with a second hearing aid in a second, opposite ear of said user.

4. The device of claim 2, wherein the NFC module further reports parameter values and accepts new parameter values for operation as said hearing aid.

5. The device of claim 1, wherein the antenna coil comprises a ferrite element.

6. The device of claim 1, wherein the controller selectively enables one of said wireless charging, NFC, and NFMI modules at a time.

7. The device of claim 6, wherein the controller systematically cycles through each resonant frequency value for said wireless charging, NFC, and NFMI modules.

8. The device of claim 1, wherein the controller monitors charging of the battery when the wireless charging module is selected and, upon detecting an overvoltage, the controller adjusts the capacitance to detune the antenna coil to a different resonant frequency that protects against the overvoltage.

9. The device of claim 1, wherein the adjustable capacitance is in parallel with said antenna coil.

10. The device of claim 1, wherein the adjustable capacitance is in series with said antenna coil.

11. A wireless communication method that comprises:
    coupling an antenna coil to a wireless charging module to charge a battery;
    coupling the antenna coil to an NFC (near field communications) module, the NFC module:
      receiving a query signal;
      providing a tag response signal; and
      receiving a command signal to set at least one parameter value affecting rendering of an audio stream;
    coupling the antenna coil to an NFMI (near field magnetic induction) module to send or receive the audio stream; and
    adjusting a capacitance in series or parallel with said antenna coil to tune a resonant frequency to a value suitable for a selected one of said wireless charging, NFC, and NFMI modules.

12. The method of claim 11, further comprising: rendering the audio stream via a speaker in a hearing aid.

13. The method of claim 12, wherein said audio stream is exchanged by said hearing aid in a first ear of a user with a second hearing aid in a second, opposite ear of said user.

14. The method of claim 12, wherein the NFC module further reports parameter values and accepts new parameter values for operation of said hearing aid.

15. The method of claim 11, wherein the antenna coil comprises a ferrite element.

16. The method of claim 11, wherein said couplings are performed selectively, one at a time, by a controller.

17. The method of claim 16, wherein the controller systematically cycles through each resonant frequency value for said wireless charging, NFC, and NFMI modules.

18. The method of claim 11, further comprising monitoring charging of the battery when the wireless charging module is selected and, upon detecting an overvoltage, varying the capacitance to detune the antenna coil to a different resonant frequency that protects against the overvoltage.

19. A hearing aid that comprises:
    a microphone;
    a speaker;
    a battery;
    an antenna coil around a ferrite element;
    a controller powered by the battery, wherein the controller filters and amplifies sound received via the microphone for playback via the speaker, and wherein the controller includes:
      a wireless charging module coupled to the antenna coil to harvest wireless power for charging the battery;
      an NFC (near field communications) module coupled to the antenna coil to receive a query signal and provide a tag response signal, wherein the NFC module further reports parameter values and accepts new parameter values for operation as said hearing aid; and
      an NFMI (near field magnetic induction) module coupled to the antenna coil to exchange audio streams with a second hearing aid in an opposite ear,
    wherein the controller selectively enables only one of the wireless charging, NFC, and NFMI modules at a time by setting an adjustable capacitance in series or parallel with said antenna coil to provide a tunable resonant frequency, wherein the controller adjusts the resonant frequency to a value suitable for the selected one of said wireless charging, NFC, and NFMI modules.

* * * * *